3,813,287
NUCLEAR REACTOR FUEL ELEMENT
Siegfried Malang, Karlsruhe-Waldstadt, Germany, assignor to Gesellschaft fur Kernforschung mbH, Karlsruhe, Germany
Filed Oct. 19, 1971, Ser. No. 190,541
Claims priority, application Germany, Nov. 17, 1970, P 20 56 392.2
Int. Cl. G21c 3/04
U.S. Cl. 176—68                                 3 Claims

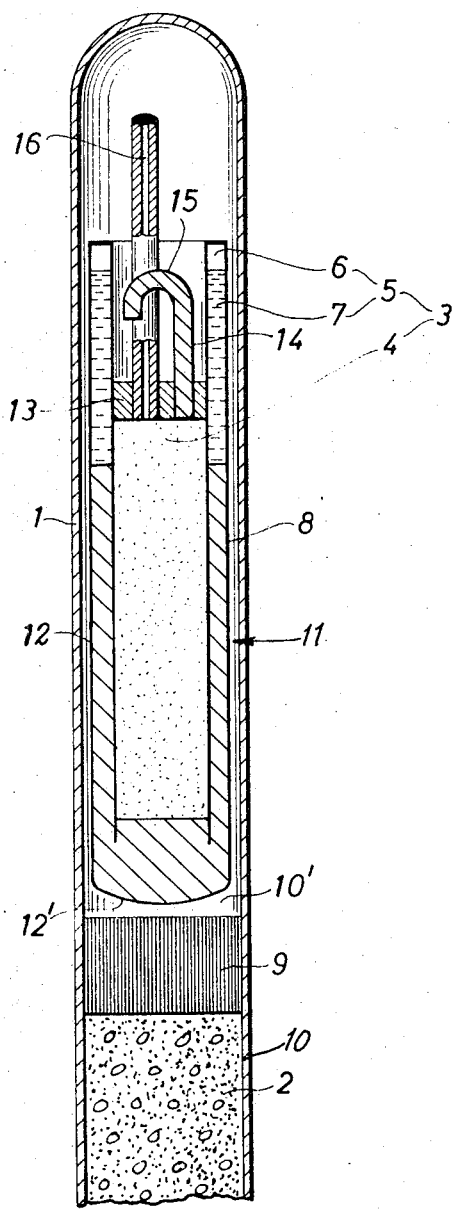

ABSTRACT OF THE DISCLOSURE

In a nuclear reactor fuel element containing a body defining one region in communication with the element fuel zone and another region containing a vaporizable fluid, the body is in the form of a cartridge separately inserted into the fuel element casing.

BACKGROUND OF THE INVENTION

The present invention relates generally to a nuclear reactor fuel element comprising a casing can having in its interior a fuel zone and a chamber, which is divided into two separate regions one of which is in communication with the fuel zone, and a movable separating element arranged in the casing for establishing a gastight seal between the two regions. Fuel is arranged in the said fuel zone, and a liquid is arranged in the other of the regions. The liquid is evaporatable as the result of heat transferred to it by the coolant of a reactor in which the fuel element is utilized. The thus-resulting steam is condensable as a function of the increasing quantity of fission gases in the one region.

The invention is based on, and provides certain improvements in, the invention disclosed in my U.S. Pat. No. 3,700,553, issued on Oct. 24, 1972.

SUMMARY OF THE INVENTION

It is an object of the present invention to extend the possibilities of application of the fuel element and permit an economical fabrication of the actual pressure equalization device. In addition, it would be favorable to eliminate problems of incompatibility of the fuel element with the fuel element casing which is formed as a cladding tube, made of e.g., zirconium.

According to the present invention, this problem is solved by forming the chamber constituted by the two fission gas regions in a cartridge which can be separately inserted into the casing of the fuel element. In a preferred embodiment of the present invention, the cartridge consists of an oblong cylindrical double-walled cup whose double wall is interrupted on the inside of the cup in the area of the front face of the inner bottom of the cup, thus opening the space between the double walls of the cup relative to the inner space proper of the cup as in a diving bell. In a preferred advanced version of this embodiment, the inner space of the cup is closed by a lid in which a tube is tightly fitted. The tube is closed by a liquid metal plug which is solid at room temperature and liquid at reactor operating temperature. For safety reasons, it is also possible by the invention to arrange several small cartridges one behind the other in the fuel element which can be inserted instead of one large cartridge. Ultimately, it is advantageous in a nuclear reactor fuel element to have a casing whose cladding consists of a zirconium alloy so that the cartridge which is inserted may be made of steel.

BRIEF DESCRIPTION OF THE DRAWING

The drawing illustrates in partial longitudinal cross section a preferred embodiment of the present invention with details of the cartridge and its location in the fuel element casing.

DESCRIPTION OF THE PREFERRED EMBODIMENT

The casing or closed cladding 1 of the rod-type fuel element is extended beyond the section 10 containing the fissile and fertile material 2, respectively, thus constituting a cavity 10' separated from the fuel 2 by a porous isolating pellet 9. The fission gases released by the fuel 2 penetrate the isolating pellet 9 and enter the cavity 10'. Cavity 10' contains the real cartridge-shaped pressure equalization device 11. The cartridge-shaped pressure equalization device 11 consists essentially of an oblong cylindrical double-walled cup 12 which has an inner space 3. The double wall of the cup 12 is penetrated, and open, respectively, in the inside area of the bottom 12' of the cup 12. In this way, a cavity 5, 8 between the double walls of the cup 12 is open like a diving bell relative to an inner space 4 proper of the cup 12, i.e., pressures can equalize between the cavity 5, 8 and the inner space 4 of the cup. The inner space 4 of the cup 12 is closed relative to the outside by a lid 13 which is inserted into the open end of the cup. A tube 14 is tightly fitted in the lid 13 and closed by a liquid metal plug 15 which is solid at room temperature and liquid at reactor operating temperature. Moreover, a filling tube 16 is welded into the lid 13 through which the inner space 4 of the cup 12 and the inner space 5 of the cartridge, respectively, can be filled. After filling the tube 16 is welded closed.

The whole inner space 3 of the cartridge and the cup respectively, is therefore constituted by the fission gas plenum 4, the space for the sealing plug (movable separation element) 8, and the annular vapor plenum 5. The vapor plenum 5 is filled partly with water 7 and vapor 6, depending upon the pressure conditions, in the way of tween the fission gas plenum 4 and the vapor plenum 5 is brought about by the sealing plug 8. In a preferred embodiment of the present invention, the sealing plug 8 consists of bismuth which liquefies at reactor operating temperature and occupies a corresponding position in the cup depending upon the pressure conditions, in the way of communicating tubes. This ensures a transmission of pressure at reactor operating temperatures from the cavity 10' through the tube 14, which is now open into the fission gas plenum 4 and from there through the liquid sealing plug 8 into the vapor plenum 5.

The function of the pressure equalization device corresponds to that described in my U.S. Pat. No. 3,700,553. As the fission gas pressure in plenum 4 increases, the internal pressure in plenums 4 and 5 rises until the vapor in plenum 5 has reached the state of dry saturation, provided the amount of liquid, volume and temperature have been selected accordingly. From this state on, the internal pressure in plenums 4 and 5 and thus also in cavity 10' remains constant with further increases in the quantity of fission gas because the vapor starts to condense and the resulting volume which is made available in the total inner space 3 can accommodate fission gases. Only after all the vapor has condensed, does the internal pressure rise again.

In steam cooled reactors the fuel pins are to be inflated to a specific internal pressure (about 30 atm.) during fabrication. This is necessary in order to prevent liquid metal and bismuth, respectively, from getting into the fuel area at the beginning of the service life of the fuel.

In order to avoid this complication in the fabrication of the much larger fuel pins for boiling and pressurized water reactors, the pressure equalization cartridge is equipped with a kind of fuse shaped like the filling tube 16 with the metal plug 15 at its upper end and inflated independent of fuel pin manufacture. If this fuse is brought to its melting temperature, the gas flows from the cartridge into the fuel pin, thus inflating the latter.

The specific advantages connected with the present invention are due to the fact that the design of the pressure equalization system as a cartridge together with a melting fuse allows fabrication of the fuel pins in the usual way without additional complications as a consequence of the use of the pressure equalization system. The cartridge may be fabricated separately. Moreover, problems of incompatibility of materials between the liquid seal and the fuel element cladding tube can be eliminated by the use of suitable materials for the cartridge. Moreover, it is possible to arrange several cartridges in a fuel pin one behind the other for safety reasons.

What is claimed is:

1. A nuclear reactor fuel element for use with a nuclear reactor, comprising, in combination:
   a casing;
   gas permeable means dividing the interior of said casing into a fuel containing cavity and a second cavity;
   a cartridge inserted separately into said second cavity in said casing, the interior of said cartridge defining a chamber divided into separate first and second regions, said first region being in communication with said fuel containing cavity, and said cartridge being composed of an oblong, cylindrical double-walled cup having a closed bottom, the inner wall of the double walls being open at the inside of said cup in the vicinity of said closed bottom so as to open the space between the double walls relative to the inner space enclosed by the inner wall in the manner of a diving bell;
   movable separating means arranged in said cartridge for establishing a gastight, pressure transmitting seal between said first and second regions;
   fuel arranged in said fuel containing cavity; and
   a liquid arranged in said second region in said cartridge, said liquid being evaporatable to vapor as a result of heat transferred to it, the thus-resulting vapor being condensable as a function of the increasing quantity of fission gases in said first region.

2. A nuclear reactor fuel element as defined in claim 1 wherein said cartridge further comprises a lid which closes the inner space of said cup; and a tube tightly fitted to said lid and closed by a liquid metal plug which is solid at room temperature and liquid at reactor operating temperature.

3. A nuclear reactor fuel element for use with a nuclear reactor, comprising, in combination:
   a casing;
   gas permeable means dividing the interior of said casing into a fuel containing cavity and a second cavity;
   a plurality of cartridges inserted and situated one behind the other within said second cavity, each said cartridge having in its interior a chamber which is divided into separate first and second regions, said first region being in communication with said fuel containing cavity;
   movable separating means arranged in each said cartridge for establishing a gastight, pressure transmitting seal between said two regions;
   fuel arranged in said fuel containing cavity; and
   a liquid arranged in said second region, said liquid being evaporatable to vapor as a result of heat transferred to it, the thus-resulting vapor being condensable as a function of the increasing quantity of fission gases in said first region.

References Cited

UNITED STATES PATENTS

| 3,350,271 | 10/1967 | Maidment et al. | 176—19 |
| 3,399,112 | 8/1968 | Dodd | 176—79 |

FOREIGN PATENTS

| 1,581,632 | 9/1969 | France | 176—68 |

CARL D. QUARFORTH, Primary Examiner

E. E. LEHMANN, Assistant Examiner

U.S. Cl. X.R.

176—72, 79